(12) United States Patent
Nath et al.

(10) Patent No.: US 8,612,423 B2
(45) Date of Patent: Dec. 17, 2013

(54) SEARCH CACHE FOR DOCUMENT SEARCH

(75) Inventors: Suman Kumar Nath, Redmond, WA (US); Pavan Kumar Athivarapu, Hyderabad (IN)

(73) Assignee: Microsoft Corporation, Redmond, WA (US)

( * ) Notice: Subject to any disclaimer, the term of this patent is extended or adjusted under 35 U.S.C. 154(b) by 210 days.

(21) Appl. No.: 12/915,045

(22) Filed: Oct. 29, 2010

(65) Prior Publication Data

US 2012/0110015 A1 May 3, 2012

(51) Int. Cl.
*G06F 17/30* (2006.01)

(52) U.S. Cl.
USPC .......................................................... 707/715

(58) Field of Classification Search
USPC .................... 707/715, 999.004, 780, 830
See application file for complete search history.

(56) References Cited

U.S. PATENT DOCUMENTS

| | | | |
|---|---|---|---|
| 5,559,984 A * | 9/1996 | Nakano et al. ................ | 711/121 |
| 5,956,705 A * | 9/1999 | Stevens et al. ......... | 707/999.002 |
| 6,901,437 B1 | 5/2005 | Li | |
| 7,548,908 B2 | 6/2009 | Fu et al. | |
| 7,565,489 B2 | 7/2009 | Mullender et al. | |
| 7,634,465 B2 | 12/2009 | Sareen et al. | |
| 7,769,805 B1 | 8/2010 | Barnes et al. | |
| 2002/0174189 A1 | 11/2002 | Peng | |
| 2005/0198076 A1 * | 9/2005 | Stata et al. ................ | 707/999.2 |
| 2006/0074925 A1 * | 4/2006 | Bixby et al. .................. | 707/100 |
| 2007/0061303 A1 | 3/2007 | Ramer et al. | |
| 2007/0083638 A1 * | 4/2007 | Pinkerton et al. ............. | 709/224 |
| 2008/0005695 A1 | 1/2008 | Ozzie et al. | |
| 2008/0071988 A1 | 3/2008 | Schloter et al. | |
| 2008/0243941 A1 * | 10/2008 | Beyer et al. ................ | 707/999.2 |
| 2009/0313247 A1 * | 12/2009 | Hogue .................. | 707/999.005 |
| 2010/0115229 A1 * | 5/2010 | Thelen .......................... | 711/207 |

OTHER PUBLICATIONS

Said, et al., "Data Prefetching Algorithm in Mobile Environments", Retrieved at << http://www.eurojournals.com/ejsr_28_3_14. pdf >>, European Journal of Scientific Research, ISSN 1450-216X, vol. 28 No. 3, 2009, pp. 478-491.

Berardi, Nick., "OmniSearch (Google Caching Engine)", Retrieved at >> http://www.codeproject.com/KB/cpp/omnisearch.aspx >>, Feb. 19, 2003, pp. 1-4.

"SONGO (Search On the Go)", Retrieved at << http://research. microsoft.com/en-us/projects/songo/ >>, Retrieved Date: Sep. 1, 2010, pp. 1-3.

Blustein, et al., "Bloom Filters. A Tutorial, Analysis, and Survey", Retrieved at << http://citeseerx.ist.psu.edu/viewdoc/download; jsessionid=2AFC4683F19BE6C6244B5497466CE6BA?doi=10.1. 1.83.2670&rep=rep1&type=pdf >>, Dec. 10, 2002, pp. 1-31.

(Continued)

*Primary Examiner* — Cam-Linh Nguyen
(74) *Attorney, Agent, or Firm* — Medley, Behrens & Lewis, LLC

(57) ABSTRACT

A method is described herein that includes receiving a query from a user at a computing device. The method also includes performing a search for one or more documents based at least in part upon the received query, wherein performing the search comprises causing a processor to perform the search through utilization of a search cache retained on the computing device, wherein the search cache comprises a results cache, an index cache, and a Boolean cache.

20 Claims, 9 Drawing Sheets

(56) References Cited

OTHER PUBLICATIONS

Broder, et al., "Network Applications of Bloom Filters: A Survey", Retrieved at << http://citeseerx.ist.psu.edu/viewdoc/download?doi=10.1.1.20.98&rep=rep1&type=pdf >>, In Internet Mathematics, vol. 1, 2002, pp. 1-11.

Zhong, et al., "Optimizing Data Popularity Conscious Bloom Filters", Retrieved at << http://citeseerx.ist.psu.edu/viewdoc/download?doi=10.1.1.157.1350&rep=rep1&type=pdf >>, 2008, pp. 1-10.

Matsumoto, et al., "Adaptive Bloom Filter: A Space-Efficient Counting Algorithm for Unpredictable Network Traffic", Retrieved at << http://intertrack.naist.jp/Matsumoto_IEICE-ED200805.pdf >>, IEICE—Transactions on Information and Systems, vol. E91-D, No. 5, May 2008, pp. 1-18.

Guo, et al., "The Dynamic Bloom Filters", Retrieved at << http://ieeexplore.ieee.org/stamp/stamp.jsp?tp=&arnumber=4796196 >>, IEEE Transactions on Knowledge and Data Engineering, vol. UME 22, No. 1, Jan. 2010, pp. 120-133.

Pagh, et al., "An Optimal Bloom Filter Replacement", Retrieved at << http://citeseerx.ist.psu.edu/viewdoc/download?doi=10.1.1.88.4131&rep=rep1&type=pdf >>, Symposium on Discrete Algorithms, Proceedings of the sixteenth annual ACM-SIAM symposium on Discrete algorithms 2005, Jan. 23-25, 2005, pp. 1-7.

Baeza-Yates, et al., "Design Trade-Offs for Search Engine Caching", Retrieved at << http://research.yahoo.com/files/a20-baeza-yates.pdf >>, ACM Transactions on the Web (TWEB), vol. 2, No. 4, Oct. 2008, pp. 1-28.

Long, et al., "Three-Level Caching for Efficient Query Processing in Large Web Search Engines", Retrieved at << http://citeseerx.ist.psu.edu/viewdoc/download?doi=10.1.1.59.2342&rep=rep1&type=pdf >>, In Proceedings of the 14th International, World Wide Web Conference, 2005, pp. 257-266.

Ntoulas, et al., "Pruning Policies for Two-Tiered Inverted Index with Correctness Guarantee", Retrieved at << http://oak.cs.ucla.edu/~cho/papers/ntoulas-sigir07.pdf >>, in SIGIR '07: Proceedings of the 30th annual international ACM SIGIR conference on Research and development in information retrieval, 2007, pp. 1-8.

Baeza-Yates, et al., "The Impact of Caching on Search Engines", Retrieved at << http://citeseerx.ist.psu.edu/viewdoc/download?doi=10.1.1.118.4938&rep=rep1&type=pdf. >>, Annual ACM Conference on Research and Development in Information Retrieval, Proceedings of the 30th annual international ACM SIGIR conference on Research and development in information retrieval, Jul. 23-27, 2007, pp. 183-190.

Zhang, et al., "Performance of Compressed Inverted List Caching in search Engines", Retrieved at << http://www2008.org/papers/pdf/p387-zhangA.pdf >>, Apr. 21-25, 2008, pp. 387-396.

Blanco, et al., "Caching Search Engine Results over Incremental Indices", Retrieved at << http://research.yahoo.com/files/rtcaching.pdf >>, Apr. 26-30, 2010, pp. 1-2.

Jing, "Application and Research on Weighted Bloom Filter and Bloom Filter in Web Cache", in WMWA '09: Proceedings of the 2009 Second Pacific-Asia Conference on Web Mining and Web-based Application, 2009, pp. 187-191.

Transier, et al., "Compressed Inverted Indexes for In-Memory Search Engines", Algorithm Engineering and Experimentation, 2008, pp. 3-12.

"Notice on the First Office Action", The State Intellectual Property Office of the People's Republic of China, Application No. 201110345038.9, Mailing Date: Mar. 4, 2013, pp. 1-10.

* cited by examiner

SEARCH CACHE FOR DOCUMENT SEARCH

BACKGROUND

Today, due to decreasing costs of computing devices, many individuals have multiple computing devices which can include, but are not limited to, desktop computers, laptop computers, multimedia players, mobile telephones, e-readers, amongst others. As individuals can have multiple computing devices, documents of an individual may be spread across these multiple devices. For example, documents of the individual can include word processing documents, multimedia files, images, spreadsheet documents, HTML pages, cached HTML pages, amongst other documents. Moreover, many online services allow individuals to retain documents in an online storage location. Thus, for any particular individual, such individual may use multiple computing devices and have multiple documents spread across such computing devices.

Currently, it is either relatively difficult or expensive (in terms of usage of battery life, bandwidth, etc.) for a user to search over all of her documents across multiple computing devices. In a specific example, a user may have documents spread across multiple computing devices, and may wish to search for documents over the computing devices through utilization of a mobile telephone. If the mobile telephone is not connected to a network, search results for a search undertaken on the mobile phone will include only documents that reside on the mobile telephone, while other documents of the user on other computing devices will not be included in the search results. Accordingly, to enable the mobile telephone to search for documents across multiple computing devices, the mobile telephone must be connected to a network.

In an exemplary architecture, each computing device of the user can be in communication with one another by way of a connection to a network. In such an architecture, the user of the mobile telephone can transmit the query to each of the computing devices and search results can be returned from each computing device of the user to the mobile phone. In another example, each computing device of the user can transmit a local index to a coordinator device, such as a cloud computing device, and the coordinator device can maintain a global index of documents of the user across the computing devices of the user. In this example, the user of the mobile telephone transmits queries to the coordinator device and the coordinator device returns results of the query to the mobile telephone.

In the examples provided above, however, each of the computing devices of the user must be connected to a network, and some form of network communication between computing devices is required for every search. Accordingly, the ability to perform an interactive search is inhibited due to network latency. Additionally, batteries of mobile devices are drained more quickly when power must be provided to components of the mobile devices used for establishing and maintaining network connections. Moreover, searches for documents across computing devices cannot be undertaken unless at least the computing device utilized to perform the search maintains a network connection with a coordinator device.

SUMMARY

The following is a brief summary of subject matter that is described in greater detail herein. This summary is not intended to be limiting as to the scope of the claims.

Described herein are various technologies pertaining to searching for documents through utilization of a search cache. With more specificity, described herein are technologies pertaining to searching over documents that are spread across multiple computing devices utilizing a search cache, wherein the search cache includes a results cache, an index cache and a Boolean cache (such as a bloom filter). In an example, the search cache can reside on a mobile computing device such that the mobile computing device can search for documents that are spread across multiple computing devices of a user without requiring the mobile computing device to transmit a query and receive query results from a separate device over a network. It is to be understood, however, that the search cache can be employed in connection with performing a search over documents available by way of the World Wide Web.

In an exemplary embodiment, a coordinator device, which can be a personal computing device or a cloud-based device, can maintain a global index of documents of a particular user that are spread across multiple computing devices of the user. For instance, the coordinator device can receive local indices from multiple computing devices of the user and can create a global index through utilization of such local indices. The global index can be an inverted index that comprises keywords and identities and locations of documents that correspond to the keywords. The coordinator device may then receive data that is indicative of a space constraint for a search cache from another computing device (e.g., a mobile computing device). The coordinator device can generate a search cache that conforms to the space constraint indicated by the mobile computing device and can transmit such search cache to the mobile computing device. For instance, the coordinator device can determine size and content of a results cache, an index cache, and a Boolean cache.

As indicated above, the search cache can include numerous different types of caches, such as a results cache, an index cache and a Boolean cache (bloom filter). The results cache can include a plurality of frequently used queries of the user and search results that correspond to those queries. Thus, if the user performs a search for documents using a query in the results cache, search results are precomputed and resident in the results cache and can be provided immediately to the user. The index cache can be an inverted two-dimensional index that comprises a plurality of keywords and identities and locations of documents that correspond to such keywords. Thus, if the user proffers a query that includes a keyword resident in the index cache, documents corresponding to such keyword in the index cache can be immediately returned to the user. The Boolean cache can output an indication of whether a keyword in a query proffered by the user corresponds to a document. Thus, for example, if the user proffers a query that is not included in the results cache and the keywords of the query are not included in the index cache, the Boolean cache can be accessed to ascertain whether the keyword exists in a predefined range of keywords (keywords starting with the letter "A" through keywords starting with the letter "D"). If the keyword is in the predefined range but is not represented in the Boolean cache, an indication that the result set for the proffered query is null can be output immediately without having to access the coordinator device.

Other aspects will be appreciated upon reading and understanding the attached figures and description.

DETAILED DESCRIPTION

Figure 1:
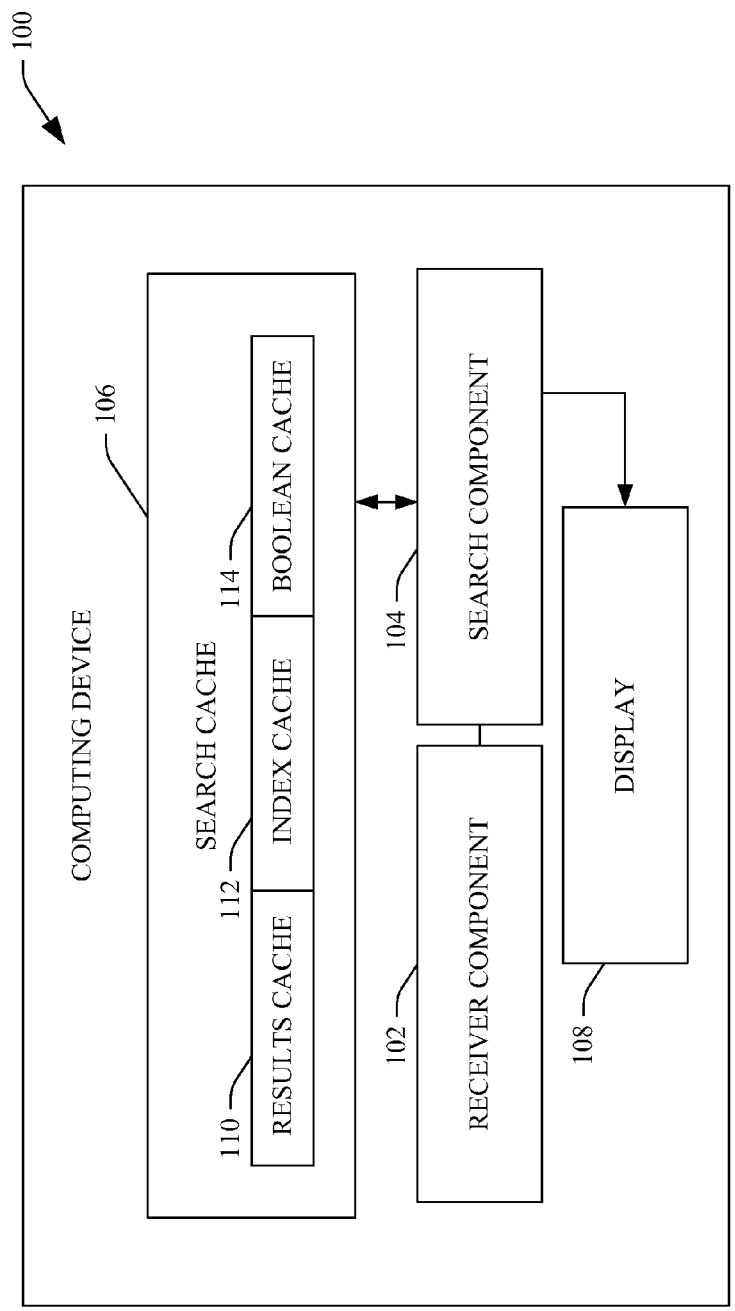
FIG. 1 is an exemplary computing device that is configured with a search cache.

Various technologies pertaining to searching over a plurality of documents through utilization of a search cache will now be described with reference to the drawings, where like reference numerals represent like elements throughout. In addition, several functional block diagrams of exemplary systems are illustrated and described herein for purposes of explanation; however, it is to be understood that functionality that is described as being carried out by certain system components may be performed by multiple components. Similarly, for instance, a component may be configured to perform functionality that is described as being carried out by multiple components. Additionally, as used herein, the term "exemplary" is intended to mean serving as an illustration or example of something, and is not intended to indicate a preference.

With reference to FIG. 1, an exemplary computing device 100 that is configured with a search cache that can be utilized in connection with searching for documents is illustrated. The computing device 100 may be any suitable computing device, including but not limited to a personal computer, a laptop computer or some other suitable computing device. In a particular example, the computing device 100 may be a mobile computing device such as a mobile telephone, a mobile media player, a mobile gaming device, an e-reader, or other suitable computing device. Furthermore, as used herein, the term "documents" is intended to encompass a multitude of different types of electronic documents, wherein such electronic documents can have keywords corresponding thereto. Thus, as used herein, a document may be a word processing document, an image, an email, a web page, a spreadsheet document, a multimedia file, or other suitable document. Moreover, documents may have keywords corresponding thereto, wherein a keyword may be a portion of text included in the document, metadata corresponding to the document, a tag assigned to the document, etc.

The computing device 100 comprises a receiver component 102 that receives a query from the user, wherein the query is formulated by the user to locate one or more documents that may be spread across computing devices of the user. For instance, query can include one or more keywords, and the user may provide the query to the computing device 100 through a suitable user interface including push buttons, a keyboard, a microphone that accepts voice commands, etc.

A search component 104 is in communication with the receiver component 102 and performs a search over a search cache 106 resident in memory of the computing device 100. The search component 104 performs a search over the search cache based at least in part upon the query received by the receiver component 102. A display 108 is in communication with the search component 104 such that search results retrieved by the search component 104 can be displayed to the user on the display 108 of the computing device 100. The display 108 may be external to the computing device 100 or may be integrated with the computing device 100. Additionally or alternatively, the computing device 100 can include a data storage medium, and search results output by the search component 104 can be retained in the data storage medium.

The search cache 106, in an exemplary embodiment, includes a plurality of different types of caches. For example, the search cache 106 may include a results cache 110, an index cache 112, and a Boolean cache 114. In an exemplary embodiment, the Boolean 114 cache can be a Bloom filter. A Bloom filter is a data structure that can be utilized to test whether an element is resident within a set.

The results cache 110 can include a plurality of queries and precomputed search results corresponding to such queries. For instance, the plurality of queries may be queries that are frequently submitted by a user or set of users. Thus, if the user frequently searched over a set of documents utilizing the query "computer sales," the results cache 110 may include such query and search results corresponding to such query. The search results corresponding to the query can indicate identities and locations of documents retrieved through use of the query. Accordingly, if the query proffered by the user is included in the results cache 110, the search component 104 can return the search results in the results cache 110 to the user without having to access another computing device by way of a network connection.

The index cache 112 can be an inverted index that includes a plurality of keywords and documents in a document corpus that correspond to such keywords. Therefore, upon receipt of the query, the search component 104 can first check the results cache 110 to determine if the query is included in the results cache 110. If the query is not included in the results cache 110, the search component 104 can search the index cache 112 for keywords that are included in query. If a keyword in the query is existent in the index cache 112, the search component 104 can return a results set that includes identities and locations of documents that correspond to the keyword of the query and cause such results set to be displayed on the display 108 of the computing device 100. Thus, if the search can be performed based upon contents of the index cache 112, the query need not be submitted to another computing device by way of a network connection and can be answered locally at the computing device 100.

The Boolean cache 114 can be configured to indicate whether or not a keyword in the query is in an element set that corresponds to documents in a particular document corpus. It is to be understood that the Boolean cache 114 is not utilized by the search component 104 to return search results. Instead, the search component 104 can return a null results set if keywords in the query do not correspond to any documents in a particular document corpus represented by the Boolean cache 114. As will be described in greater detail below, the Boolean cache 114 may be associated with a certain range such that only a subset of keywords that correspond to a document corpus are included in the Boolean cache 114 due to size constraints on the Boolean cache 114. For example, keywords corresponding to a document corpus that begin with the letter "A" through keywords corresponding to the document corpus that begin with the letter "D" can be included in the Boolean cache 114 while other key words are not included in the Boolean cache 114.

Continuing with this example, if the query includes the keyword "computer" and is not included in the results cache 110 or the index cache 112, the search component 104 can determine whether such keyword is included in a range corresponding to the Boolean cache 114. In this example, the keyword "computer" begins with the letter "C" and is thus included in the range of the Boolean cache 114. The search component 104 may then check the Boolean cache 114 to determine if the keyword "computer" is included in the set of keywords represented by the Boolean cache 114. If the keyword "computer" is not found in the element set of the Boolean cache 114, then no documents in the document corpus of interest correspond to such keyword, and the search component 104 can return a null result set to the user via the display 108. If the search component 104 determines that the keyword "computer" is included in the Boolean cache 114, then at least one document corresponds to such keyword, and the search component 104 is unable to complete the search locally at the computing device 100. In this case, the search component 104 can be configured to transmit the query to another computing device that has access to a larger index such that search results can be returned to the user.

While the search cache 106 has been described above as including the results cache 110, the index cache 112 and the Boolean cache 114, in some instances one or more of such caches 110, 112 or 114 may be excluded from the search cache 106. For instance, the search cache 106 may be constrained with respect to space, and an ability to complete searches locally on the computing device 100 may be optimized or substantially optimized by including the index cache 112 and the Boolean cache 114 in the search cache 106 but omitting the results cache 110 from the search cache 106. Particular contents of the search cache 106 can depend upon memory constraints corresponding to the computing device 100 and size of a document corpus that is desirably searched over by the search component 104 (e.g., a number of documents in the document set).

A particular embodiment will now be described, wherein the computing device 100 is a mobile computing device and a document corpus that is desirably searched over is spread across multiple computing devices of the user. For instance, the user may have a personal computer, a work-related computer, a laptop computer and multiple other computing devices, and documents may be spread across such computing devices. As will be described in greater detail below, a coordinator device can create a global index that indexes keywords of documents with the identities and locations of such documents. The computing device 100 can indicate to the coordinator device an amount of space in memory available on the computing device 100 for the search cache 106. The coordinator device may then generate the search cache 106 in accordance with such memory constraints and transmit the search cache 106 to the computing device 100, wherein the search cache 106 may be retained in the memory of the computing device 100. The user may then perform a search over documents that are spread across the multiple computing devices using the computing device 100 without requiring a query to be transmitted to the coordinator device or to other computing devices of the user. The locality of the search cache can reduce utilization of battery of the computing device 100 and can be performed if the computing device 100 is not connected to the coordinator device or other computing devices of the user by way of a network. Moreover, as searches can be computed relatively quickly using the search cache 106, interactive search is less inhibited when compared to conventional systems.

For instance, the computing device 100 may be a mobile phone that is out of coverage but the user may still wish to determine a location of one or more documents that may or may not reside on the computing device 100. The user can proffer the query to the computing device 100 and such query can be received by the receiver component 102. The search component 104 can initially search the results cache 110 for the query and can provide search results to the user via the display 108 if the query is included in the results cache 110. If the query is not included in the results cache 110, the search component 104 can search the index cache 112 for keywords that are included in the query. If the keywords in the query are included in the index cache 112, then the search component 104 can output search results to the user via the display 108 based upon contents of the index cache 112. If the key words in the query are not included in the index cache 112, the search component 104 can access the Boolean cache 114. If the keywords of the query are not in the range of the Boolean cache 114, then the search component 104 can initiate a network connection and the query can be transmitted to the coordinator device such that a search can be performed over a global index of documents of the user. If one or more keywords are in the range of the Boolean cache 114, the search component 104 can ascertain whether the Boolean cache 114 includes the keyword(s). If the Boolean cache 114 indicates that keywords of the query are not included in the Boolean cache 114, the search component 104 can indicate to the user via the display 108 that there are no documents that correspond to the query submitted by the user. If the Boolean cache 114 indicates that at least one keyword of the query is included in the Boolean cache 114, then the search component 104 can initiate a network connection and the query can be transmitted to the coordinator device or to other computing devices of the user.

Again, this architecture is exemplary in nature, and it is to be understood that the search cache 106 can be utilized in connection with performing a web search. For instance, the computing device 100 can be in communication with a search engine. To decrease the load of the search engine and/or to increase the speed of performing the search, the search engine can transmit the search cache 106 to the computing device 100. Thus, if the user proffers a query that is desirably utilized to search over contents of the web and such query is included in the results cache 110, the search component 104 on the computing device 100 can return search results to the user without having to access the search engine directly. Similarly, if one or more key words are included in the index cache 112 and the search cache 106, the computing device 100 need not request that the search engine perform the search on one or more servers.

Figure 2:
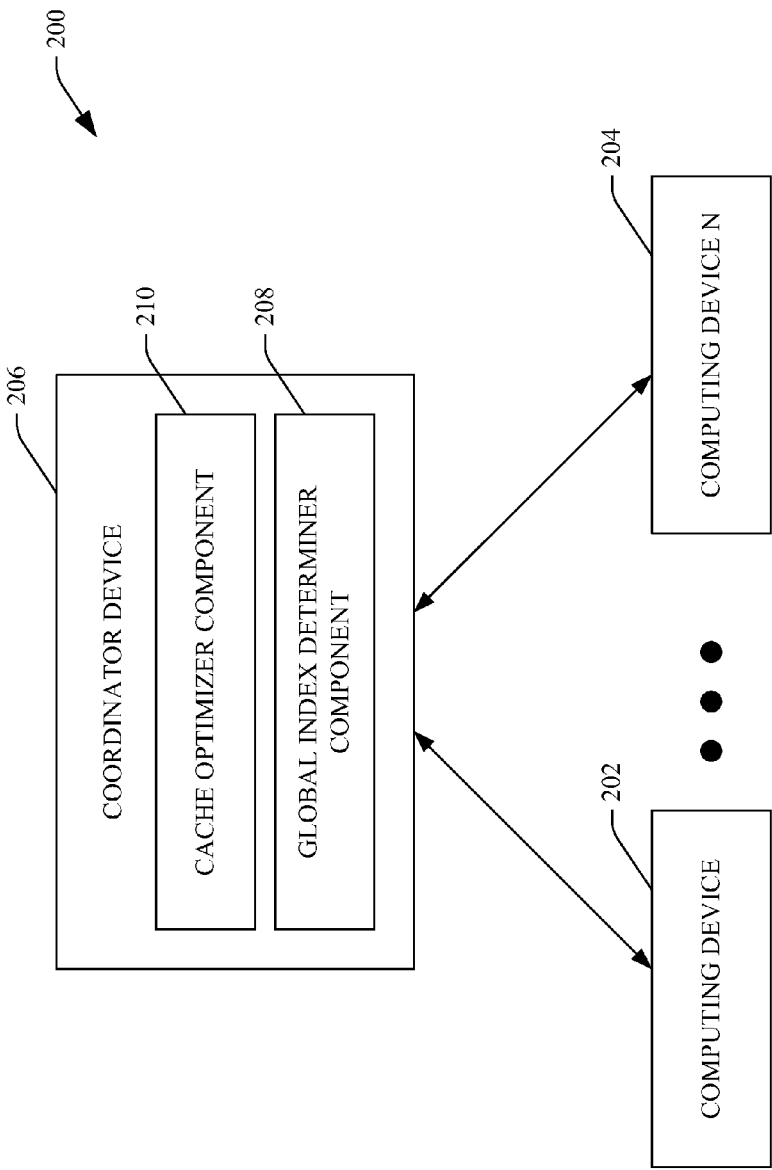
FIG. 2 is a functional block diagram of an exemplary system that facilitates creating a global index of documents of a user that are spread across multiple computing devices.

Referring now to FIG. 2, an exemplary system 200 that facilitates generating the search cache 106 is illustrated. The system 200 comprises a plurality of computing devices 202-204 that belong to or are used by a particular user. As described above, the computing devices 202-204 may include desktop computers, laptop computers, mobile computing devices such as multimedia players, mobile telephones, etc. Additionally, one of the computing devices 202-204 may be the computing device 100 described above.

The system 200 further comprises a coordinator device 206. In an example, the coordinator device 206 may be a cloud computing device that is accessible to the computing devices 202-204 by way of a suitable network connection. In another example, the coordinator device 206 may be a computing device that is owned or used by the user that owns or uses the computing devices 202-204. Thus, for instance, the coordinator device 206 may be a desktop computer, a laptop computer, etc.

Each of the computing devices 202-204 can have documents of the user retained thereon. The computing devices 202-204 may be configured to generate local indices that index documents retained on the respective computing devices 202-204. For instance, the computing device 202 may generate an index that indexes keywords corresponding to documents retained on the computing device 202 with identities and locations of such documents, and the computing device 204 can be configured to generate an index that indexes keywords corresponding to documents retained on the computing device 204 with identities and locations of such documents. The computing devices 202-204 can be configured to transmit these local indices to the coordinator device 206.

The coordinator device 206 can include a global index determiner component 208 that receives the local indices from the computing devices 202-204 and generates a global index for documents retained across the computing devices 202-204 (and possibly also on the coordinator device 206). That is, the global index determiner component 208 can generate an index that indexes keywords with identities and locations of documents spread across the computing devices 202-206. Thus, a module resident on the coordinator device 206 that is configured to perform a search for documents could receive a query that includes at least one keyword and identify documents and locations thereof that correspond to such keyword across the computing devices 202-204 through utilization of a global index generated by the global index determiner component 208.

The coordinator device 206 further comprises a cache optimizer component 210 that substantially optimizes the search cache 106 that is to be transmitted to the computing device 100 amongst the computing devices 202-204. For instance, as will be described in greater detail below, the cache optimizer component 210 can receive a size constraint for the search cache 106 from the computing device 100 and can thereafter generate a search cache 106 based at least in part upon the size constraint provided by the computing device 100. The cache optimizer component 210 can generate such cache by analyzing the global index created by the global index determiner component 208, search history of the user, and other data corresponding to the documents. The resultant search cache 106 can be configured by the cache optimizer component 210 to substantially maximize a probability that a search desirably performed by the user can be completed locally at the computing device 100 given the size constraint for the search cache 106. Specifically, the cache optimizer component 210 can determine size and content of the results cache 110, size and content of the index cache 112 and size and content of the Boolean cache 114 such that probability of completing a search locally on the computing device 100 is substantially maximized given the size constraint of the search cache 106.

Furthermore, the coordinator device 206 can be configured to transmit updates to the search cache 106 to the computing device 100 from time to time (e.g., after a change has been made to documents of the user and after the computing device 100 is connected with the coordinator device 206). As described above, the computing devices 202-204 can be configured to generate local indices that index keywords with identities and locations of documents thereon. Contents of the computing devices 202-204, however, do not remain static. That is, the user of the computing devices 202-204 may create new documents, delete documents, modify existing documents, etc. The computing devices 202-204 can be configured to update local indices thereon, and transmit such updates to the coordinator device 206. The updates can be changes to the indices (deltas), rather than entire indices. The global index determiner component 208 can update the global index based at least in part upon the changes to the local indices provided by the computing devices 202-204. The cache optimizer component 210 can perform a subsequent optimization based upon alterations to the global index, and the coordinator device 206 can transmit updates to the search cache 106 to the computing device 100. Again, the coordinator device 206 need not transmit an entirely new search cache, but can transmit updates to the existing search cache 106 at the computing device 100.

Figure 3:
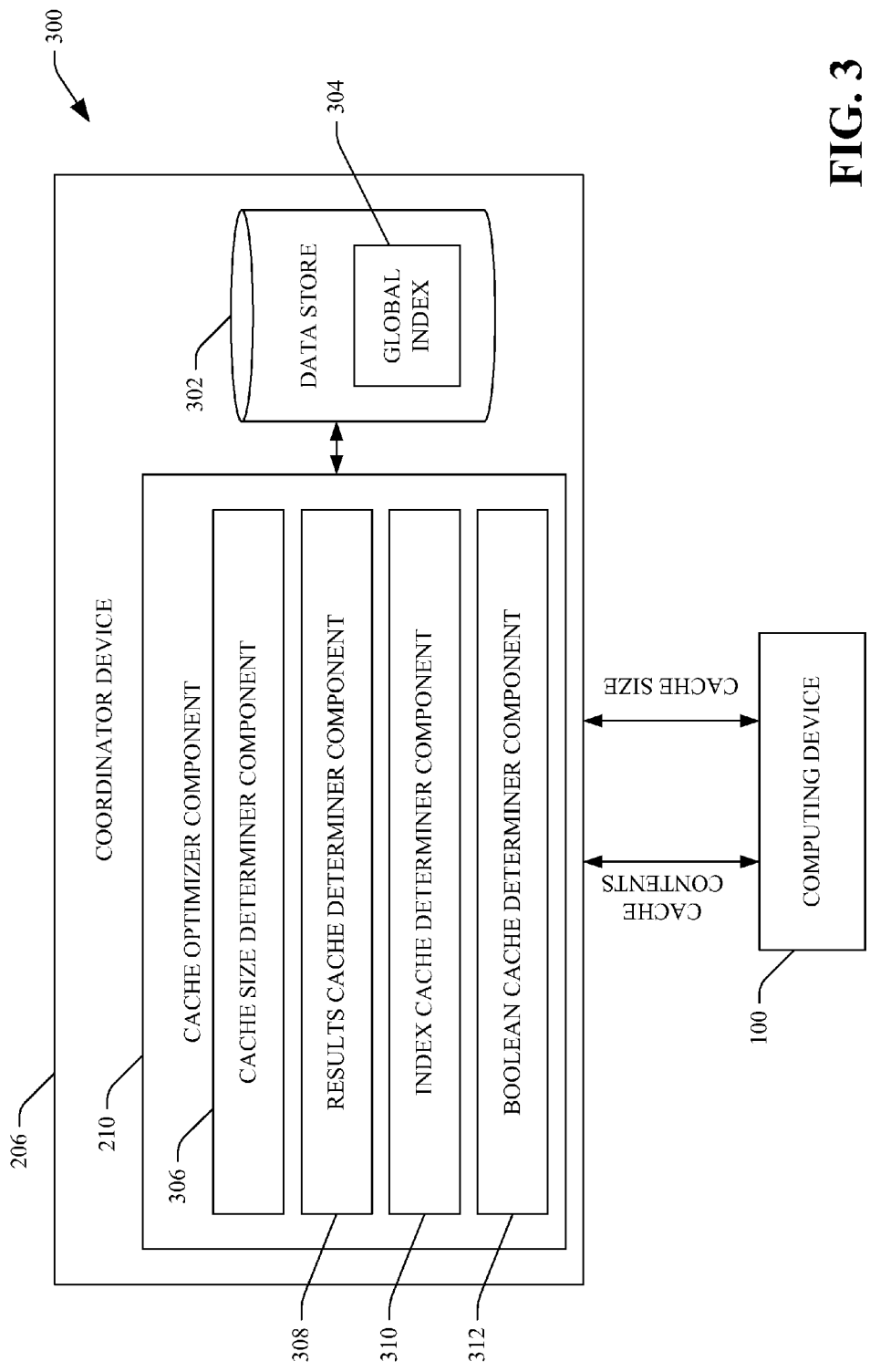
FIG. 3 is a functional block diagram of an exemplary system that facilitates building a search cache that is subject to a space constraint.

Now referring to FIG. 3, an exemplary system 300 that facilitates optimizing the search cache 106 and providing such search cache 106 to the computing device 100 is illustrated. The system 300 comprises the coordinator device 206. The coordinator device 206 includes or has access to a data store 302 that comprises a global index 304 generated by the global index determiner component 208. The system 300 further comprises the computing device 100, which is in communication with the coordinator device 206 by way of a suitable communications connection, such as a USB connection, network connection, etc. The computing device 100 may wish to receive a search cache from the coordinator device 206, such that searches for documents over a plurality of different computing devices may be undertaken locally at the computing device 100, wherein such computing device 100 may have particular constraints associated therewith (e.g., battery power constraints, storage constraints, etc.).

The computing device 100 can communicate a desired search cache size to the coordinator device 206. The transmittal of the search cache size can be initiated either by the computing device 100 or the coordinator device 206 upon the computing device 100 being in communication with the coordinator device 206 by way of a suitable communications link. For instance, the computing device 100 may be configured with functionality that allows the computing device 100 to determine a particular amount of memory (e.g., flash memory) that is desirably utilized for the search cache 106.

The coordinator device 206 includes the cache optimizer component 210 which can optimize the search cache 106 for the computing device 100 given the size constraint. To perform such optimization, the cache optimizer component 210 can access the data store 302 to review the global index 304, search history of the user, and any other data that may be pertinent to searches with respect to documents of the user across computing devices.

The cache optimizer component 210 comprises a cache size determiner component 306 that determines a size of the result cache 110, the index cache 112 and the results cache 114 that is desirably transmitted to the computing device 100. Pursuant to an example, the computing device 100 can indicate that 1 GB of memory space is allocated for the search cache 106. The cache size determiner component 306 can determine size of the results cache 110 $b$, size of the index cache 112 $a$, and thus size of the Boolean cache 114 as 1 GB-a-b. These sizes can be determined, for instance, based upon an analytical exploration of the global index 304 and the search history of the user, amongst other data.

The cache optimizer component 210 further comprises a results cache determiner component 308 that is configured to determine contents of the results cache 110 given the constraint of the size of the results cache 110 output by the cache size determiner component 306. The results cache determiner component 308 can determine contents of the results cache 110 by analyzing historical queries proffered by the user. For instance, if a user frequently issues a particular query, the results cache determiner component 308 can cause such query and search results corresponding thereto to be placed in the results cache so long as the size constraint of the results cache 110 is respected.

The cache optimizer component 210 can additionally include an index cache determiner component 310 that can determine contents of the index cache 112 given the size constraint on such index cache. Again, the index cache determiner component 310 can determine contents of the index cache 112 by analyzing the global index 304, hit rates with respect to the global index 304, key words corresponding to documents, prior searches of the user, etc. Furthermore, the index cache determiner component 310 can use any suitable technique when pruning the global index 304 to generate the index cache 112. For instance, the index cache determiner component 310 can utilize known techniques for guaranteeing that a top k number of search results will correspond to a keyword represented in the index cache 112.

The cache optimizer component 210 can further comprise a Boolean cache determiner component 312 that can determine contents of the Boolean cache based at least in part upon an analytical analysis of the global index 304, prior queries proffered by the user or other users, etc. Additionally, the Boolean cache determiner component 312 can determine the contents of the Boolean cache 114 while respecting the size constraints of the Boolean cache 114 output by the cache size determiner component 306. In some instances, the cache size determiner component 306 can output a constraint such that all keywords in the global index 304 are not able to be included in the Boolean cache 114. The Boolean cache determiner component 312 can analyze the keywords in previous searches undertaken by the user and can select a particular range of keywords to include in the Boolean cache 114 to respect the size constraint output by the cache size determiner component 306. For instance, the cache size determiner component 306 can output a restriction on size of the Boolean cache of 250 MB. The Boolean cache determiner component 312 can ascertain that only a certain range of keywords can be included in the Boolean cache 114 to respect such size constraint. Accordingly, for instance, the Boolean cache determiner component 312 can select some range of keywords to include in the Boolean cache 114 (e.g., keywords beginning with the letter "D" through key words beginning with the letter "M"). As described above, this range can be selected to substantially maximize a probability that a search request by a user of the mobile device can be completed locally at the computing device 100. It is to be understood that what has been described above is an exemplary mechanism for determining sizes and content of portions of a search cache, and any suitable manner for determining such sizes and content based upon user history and/or document content is contemplated by the inventors and is intended to fall within the scope of the hereto-appended claims.

While the cache optimizer component 110 has been described as generating the search cache 106 to substantially maximize a probability that a search for documents undertaken at the computing device 100 can be completed locally, another optimization that can be undertaken by the cache optimizer component is to substantially minimize costs with respect to performing searches. Provided below is an exemplary formulation of a cost function that can be substantially minimized by the cache optimizer component 210 when determining sizes of the caches in the search cache 106. In the example formulation provided below, the search cache 106 only includes the index cache 112 and the Boolean cache 114.

In this formation, l represents the hit rate for queries in the index cache 310. The equation for l can be written as follows:

$$l(a, \tau, s, \alpha) = s \times \left( \frac{1 - e^{\min\left(1, \frac{a \times \tau}{\alpha}\right)}}{1 - e^{-1}} \right) \quad (1)$$

where a is the fraction of the search cache 106 that is allocated to the index cache 112, τ is the fraction $$\frac{\text{memory allocated for cache}}{\text{memory used by global index}}$$

s is the hit rate in the global index 304 and is indicative of how many searched terms are present in the document corpus, and α is the fraction $$\frac{\text{average size of an index list in index cache}}{\text{average size of an index list in the global index}}.$$

The dependence between the hit rate of the index cache 112 and size of the search cache 106 is inverse exponential bounded above by the hit rate in the global index 304 (s).

Further, r in this formulation can represent the fraction of all key words in the document corpus that are not able to be accommodated in the index cache 112 but which are represented in the Boolean cache 114, which can be expressed as follows, under appropriate conditions:

$$\frac{\text{number of words in the bloom filter}}{\text{total number of words in the corpus} - \text{number of words present in the index cache}} = \quad (2)$$

$$\frac{(1-a) \times A}{y} \bigg/ \frac{B}{X} - \frac{a \times A}{x}$$

where A is the size of the search cache 106, B is the size of the global index 304, y is the average size of a word in the Boolean cache 114, X is the average size of a word in the global index 304, and x is the average size of a word in the search cache 106. This equation can be rewritten in a general form as follows:

$$r(a, p, \tau, x, \alpha) = \min\left(1, \max\left(0, \frac{\tau \times (1-a) \times \frac{x}{y(p)}}{1 - \frac{a \times \tau}{\alpha}}\right)\right) \quad (3)$$

In equation (3), $$\frac{a \times \tau}{\alpha} = \frac{\text{number of words that can be } accomidated \text{ in index cache}}{\text{number of words present in the global index}}, \quad (4)$$

and $$y(p) = \log_2\left(\frac{1}{p}\right) \times \log_2 e \quad (5)$$

is the average size of a word in the Boolean cache, where p is a false positive rate associated with the Boolean cache 114 (Bloom filter).

Furthermore, h can indicate the hit rate in the Boolean cache 114. Since the hit rate in the global index 304 can be assumed to follow a uniform distribution, h has two components. A hit in the Boolean cache 114 due to a correct match and a hit in the Boolean cache 114 due to a false positive. Accordingly $h(p,s)=s+(1-s)\times p$.

The cost of a miss in the search cache 106 can consist of two different components: 1) misses in the index cache 112 and not present in a range represented by the Boolean cache 114; and 2) misses in the index cache 112 and present in the range represented by the Boolean cache 114 and hits in the Boolean cache 114. Accordingly, the equation for cost c can be formulated as follows:

$$c(a,p,\tau,x,\alpha,s)=(1-l(a,\tau,s,\alpha))\times\{r(a,p,\tau,x,\alpha)\times h(p,s)+1-r a,p,\tau,x,\alpha\} \quad (6)$$

When determining sizes of the caches, the cache size determiner component 306 can substantially minimize a cost function described above. This can be determined through analytical analysis of search history over the global index 304.

Figure 4:
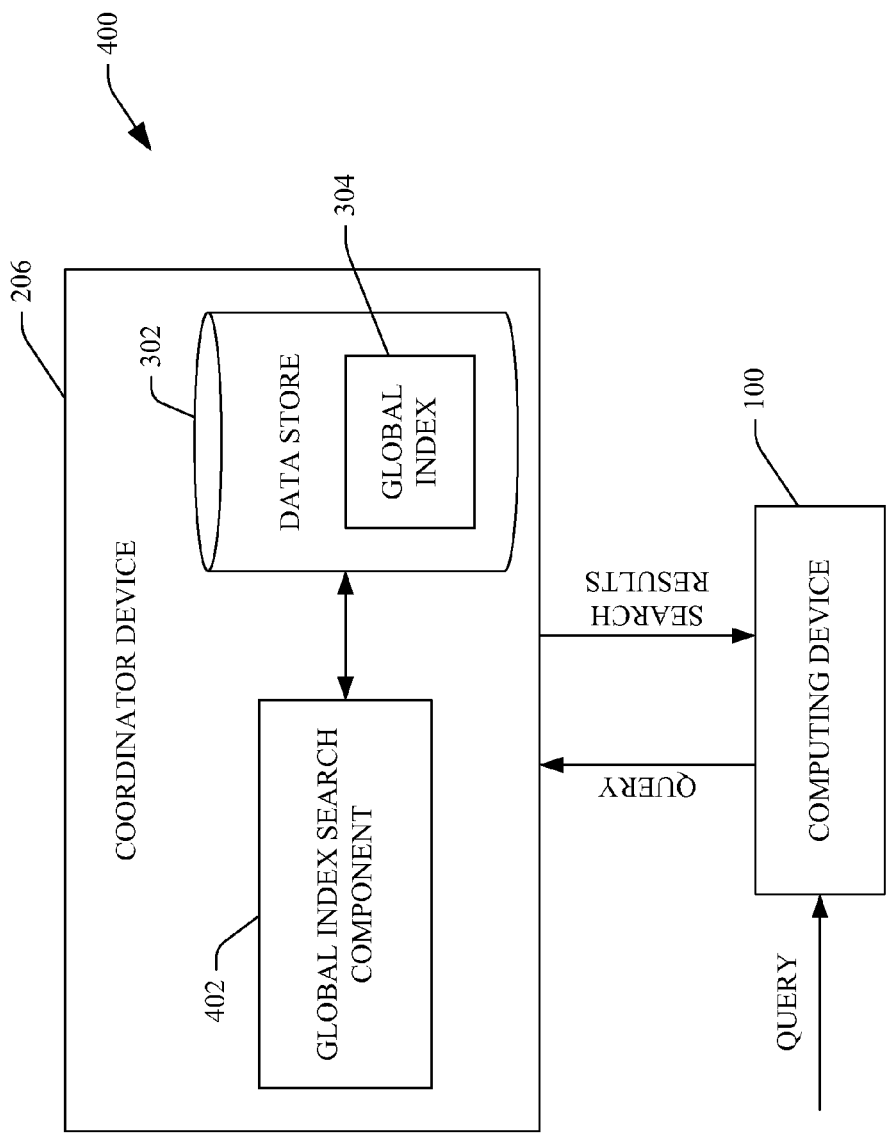
FIG. 4 is a functional block diagram of an exemplary system that facilitates searching over a plurality of documents that are spread across multiple computing devices of a user.

Turning now to FIG. 4, an exemplary system 400 that facilitates searching for documents located across multiple computing devices of a user is illustrated. The system 400 comprises the computing device 100 that is in communication with the coordinator device 206. As described above, the coordinator device 206 includes, or has access to, a data store 302 that retains a global index 304. For instance, the global index 304 can include key words corresponding to documents across computing devices of the user, identities of documents corresponding to such key words, and locations of the documents.

In the example depicted in FIG. 4, the user provides a query to the computing device 100. The search component 104 searches the search cache 106 in the computing device 100 based at least in part upon contents of the query. Generally, it is desirable that the computing device 100 be able to perform the search locally through utilization of the search cache 106. In some cases, however, a search requested by the user may not be able to be answered through utilization of the search cache 106. For example, if the query is not included in the results cache 110, keywords of the query are not included in the index cache 112, and/or the Boolean cache 114 is unable to output a null result set, then the search cannot be completed locally. In such a case, the search component 104 can be configured to initialize a network connection with the coordinator device 206 and transmit a query proffered by the user to the coordinator device 206. The coordinator device 206 can include a global index search component 402 that searches the global index 304 based upon the query. The global index search component 402 can determine a result set based upon the search of the global index 304, wherein the result set can include identities and locations of documents on computing devices of the user and can cause the search results to be transmitted from the coordinator device 206 to the computing device 100. The user may then view the search results on the display 108 of the computing device 100.

With reference now to FIGS. 5-8, various exemplary methodologies are illustrated and described. While the methodologies are described as being a series of acts that are performed in a sequence, it is to be understood that the methodologies are not limited by the order of the sequence. For instance, some acts may occur in a different order than what is described herein. In addition, an act may occur concurrently with another act. Furthermore, in some instances, not all acts may be required to implement a methodology described herein.

Moreover, the acts described herein may be computer-executable instructions that can be implemented by one or more processors and/or stored on a computer-readable medium or media. The computer-executable instructions may include a routine, a sub-routine, programs, a thread of execution, and/or the like. Still further, results of acts of the methodologies may be stored in a computer-readable medium, displayed on a display device, and/or the like. The computer-readable medium may be a non-transitory medium, such as memory, hard drive, CD, DVD, flash drive, or the like.

Figure 5:
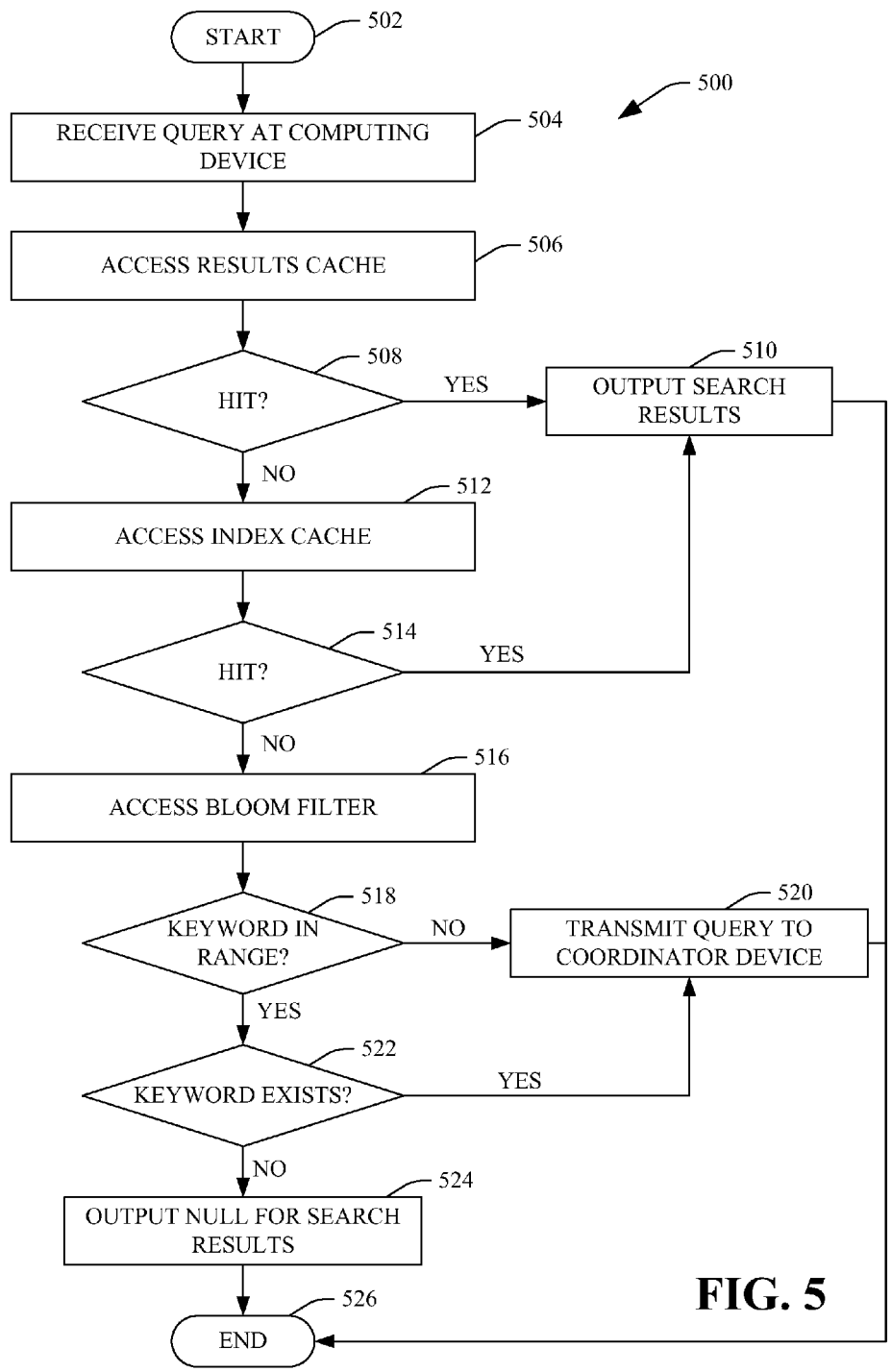
FIG. 5 is a flow diagram that illustrates an exemplary methodology for utilizing a search cache to perform a search for documents residing on a plurality of different computing devices.

Referring now to FIG. 5, an exemplary methodology 500 that facilitates performing a search over the search cache 106 is illustrated. The methodology 500 begins at 502, and at 504 a query is received at the computing device 100 of a user. For instance, the query may be formulated to locate documents that reside on a plurality of different computing devices of the user.

At 506, responsive to receipt of the query, the results cache 110 in the search cache 106 is accessed. For example, the query proffered by the user can be compared with queries in the results cache 110. At 508, a determination is made regarding whether there has been a hit in the results cache 110 (whether the query is existent in the results cache 110). If there has been a hit, then the methodology 500 proceeds to 510 and search results are output to the user. These search results can be retrieved from the results cache.

If at 508 it is determined that there has not been a hit, then the index cache 112 can be accessed at 512. Specifically, the index cache can be analyzed to determine if one or more keywords in the query received at 504 are represented in the index cache 112. At 514, a determination is made regarding whether there has been a hit in the index cache using one or more keywords in the query. If there has been a hit, then the search results corresponding to the keyword(s) in the index cache are output to the user at 510. If there has not been a hit at 514, then the Bloom filter is accessed at 516.

As described above, the Bloom filter may be restricted to a particular range, such as an alphabetic range of keywords. At 518, a determination is made regarding whether the one or more keywords are in the range of the Bloom filter. If it is determined that the keywords are not in the range of the Bloom filter, then at 520 the query is transmitted to the coordinator device 206, wherein the global index 304 can be searched over utilizing such query. If a keyword in the query is in the range corresponding to the Bloom filter, then a determination is made regarding whether the keyword is represented in the Bloom filter at 522. If it is determined that the keyword is represented in the Bloom filter, then the methodology 500 proceeds to 520 where the query is transmitted to the coordinator device for the search to be undertaken thereon. If the keyword is not represented in the Bloom filter, then at 524 a null result set can be output to the user. The methodology 500 completes at 526.

Figure 6:
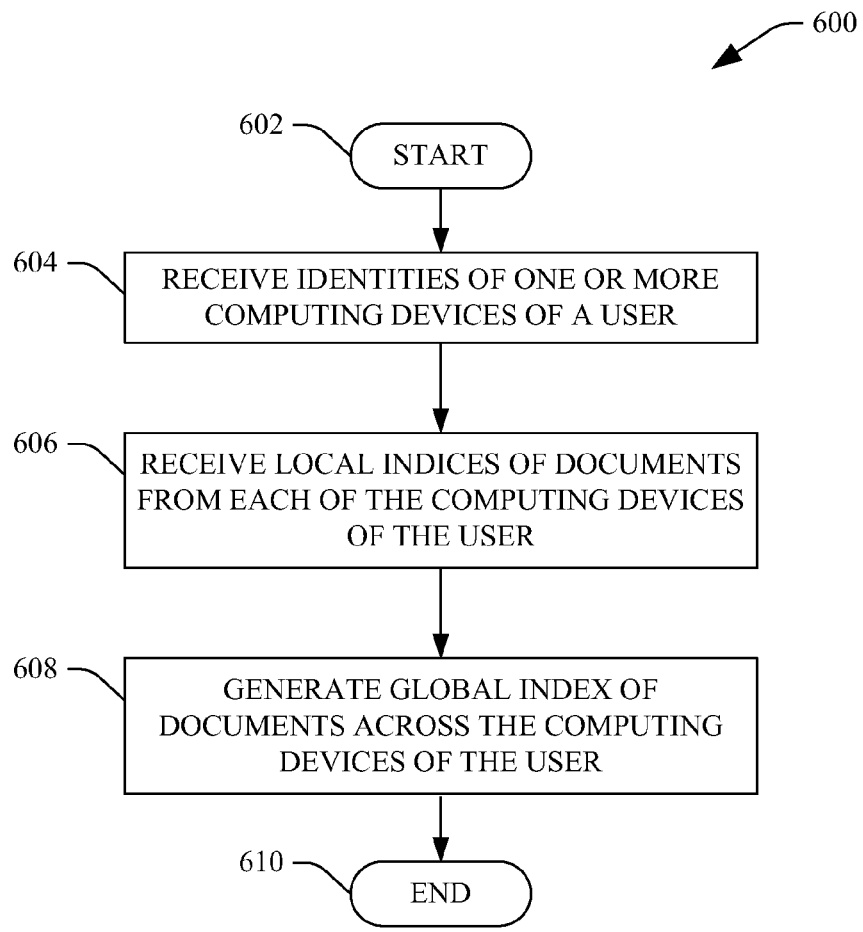
FIG. 6 is a flow diagram that illustrates an exemplary methodology for building a global index of documents across multiple computing devices of a user.

With reference now to FIG. 6, an exemplary methodology 600 that facilitates generating a global index of documents across computing devices of a user is illustrated. The methodology 600 starts at 602, and at 604 identities of one or more computing devices are received from a user. For instance, the user can cause each computing device to be in communication with a coordinator device and, for instance, by providing data that uniquely identifies the user can indicate that such computing devices are desirably included in a searching/indexing service. For instance, the user can access a particular web page through utilization of a browser and provide data that indicates the identity of the user. This can be undertaken for each computing device that the user wishes to have included in the searching/indexing service.

At 606, local indices of documents from each of the computing devices identified at 604 are received. For example, the computing devices can be configured to generate local indices that index keywords with documents retained on the computing devices.

At 608, a global index of documents across the computing devices of the user is generated. Accordingly, searching such global index can provide search results for documents across the multiple computing devices. The methodology 600 completes at 610.

Figure 7:
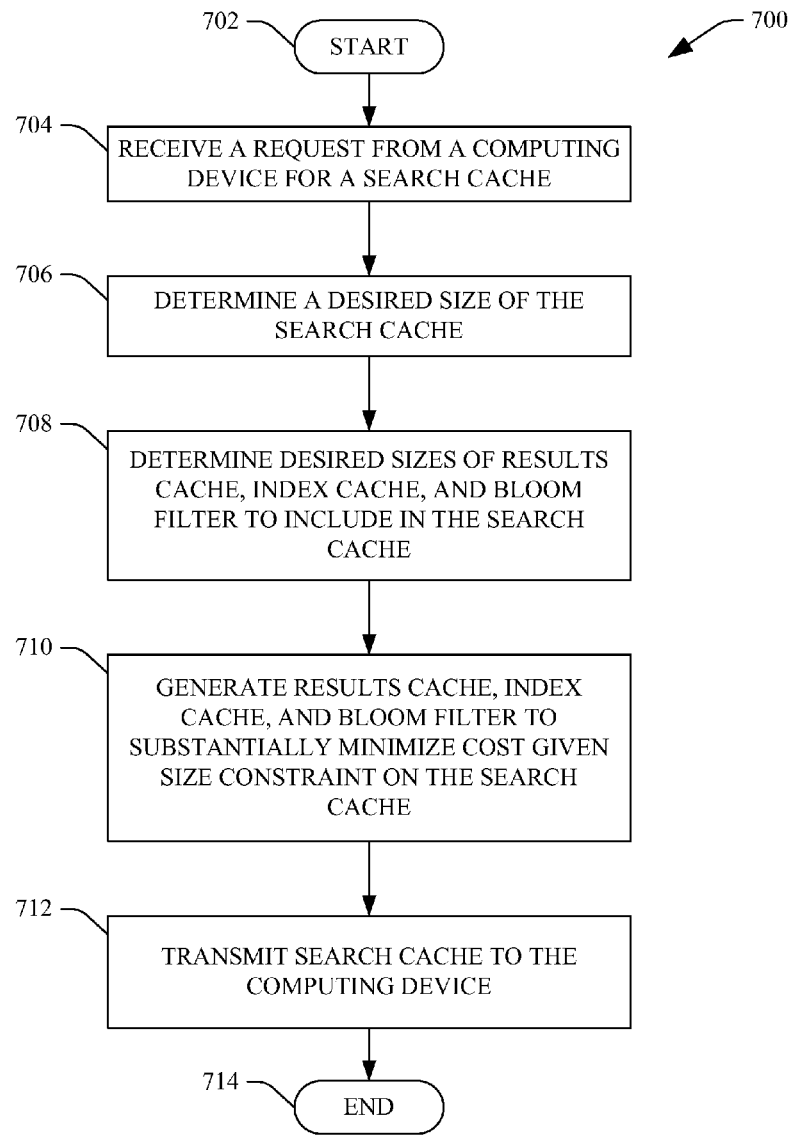
FIG. 7 is a flow diagram that illustrates an exemplary methodology for generating and transmitting a search cache to a mobile computing device.

Now referring to FIG. 7, an exemplary methodology 700 that facilitates computing and transmitting a search cache to a computing device is illustrated. The methodology 700 starts at 702, and at 704 a request from a computing device for a search cache is received. At 706, a desired size of the search cache is determined. For example, the computing device can output data that describes a desired size of the search cache.

At 708, desired sizes of a results cache, an index cache and a Bloom filter that are to be included in the search cache are determined. Such sizes can be ascertained through analytical analysis of the global index, previous searches proffered by the user, keywords corresponding to documents, the number of documents in the document corpus, amongst other data.

At 710 the results cache, the index cache and the Bloom filter are generated to substantially minimize cost for searches using the search cache given the size constraint on the search cache. At 712, the search cache is transmitted to the computing device and at 714 the methodology 700 completes.

Figure 8:
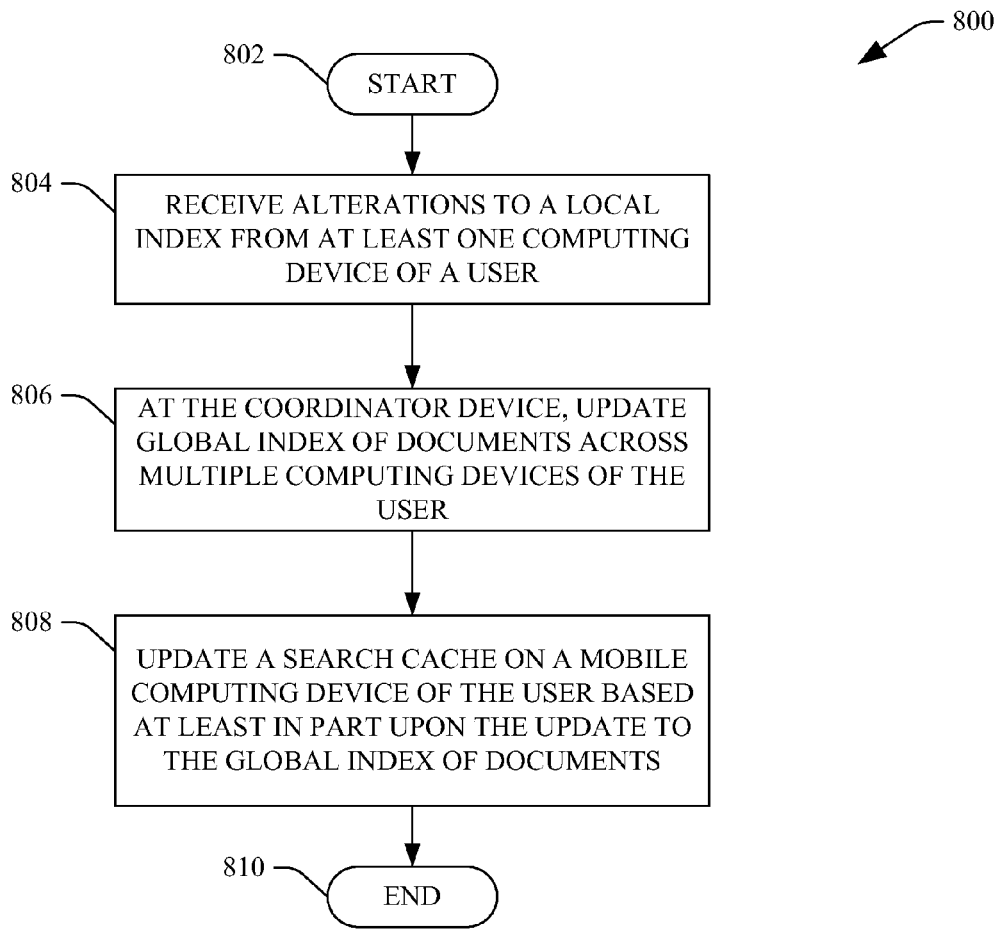
FIG. 8 is a flow diagram that illustrates an exemplary methodology for updating a search cache resident upon a mobile computing device.

Turning now to FIG. 8, an exemplary methodology 800 for updating a search cache on a mobile computing device is illustrated. The methodology 800 starts at 802, and at 804 alterations to a local index are received from at least one computing device of a user. Specifically, at least one computing device may be configured to generate a local index initially and transmit such local index to a coordinator device. Thereafter, however, rather than transmitting an entire local index, the computing device can be configured to transmit changes to the local index to the coordinator device. Therefore, the coordinator device can receive these alterations to local indices from multiple computers of a user.

At 806, a global index of documents across multiple computing devices of the user is updated based at least in part upon the alterations the local index received from the at least one computing device of the user. Specifically, a document on the computing device may be added, deleted, modified, moved, etc. by the user and the local index on the computing device can be updated to indicate such transformation of the document. This change can then be transmitted to the coordinator device which can update the global index based at least in part upon the changes to the local index transmitted by the computing device. As described above, the global index can take into consideration documents spread across multiple computing devices of the user and/or accessed by the user, including mobile computing devices, desktop computing devices, servers, cloud storage devices, etc. Furthermore, mobile computing devices are intended to encompass mobile telephones, laptop computers, personal digital assistants, multimedia players, mobile gaming consoles, and the like.

At 808, a search cache on a mobile computing device is updated based at least in part upon the update to the global index of documents. For example, rather than retransmitting an entirely new search cache, the coordinator device can transmit alterations to an existing search cache on the computing device. Accordingly, a relatively small amount of data can be transmitted to the computing device to update the search cache. The methodology completes at 810.

Figure 9:
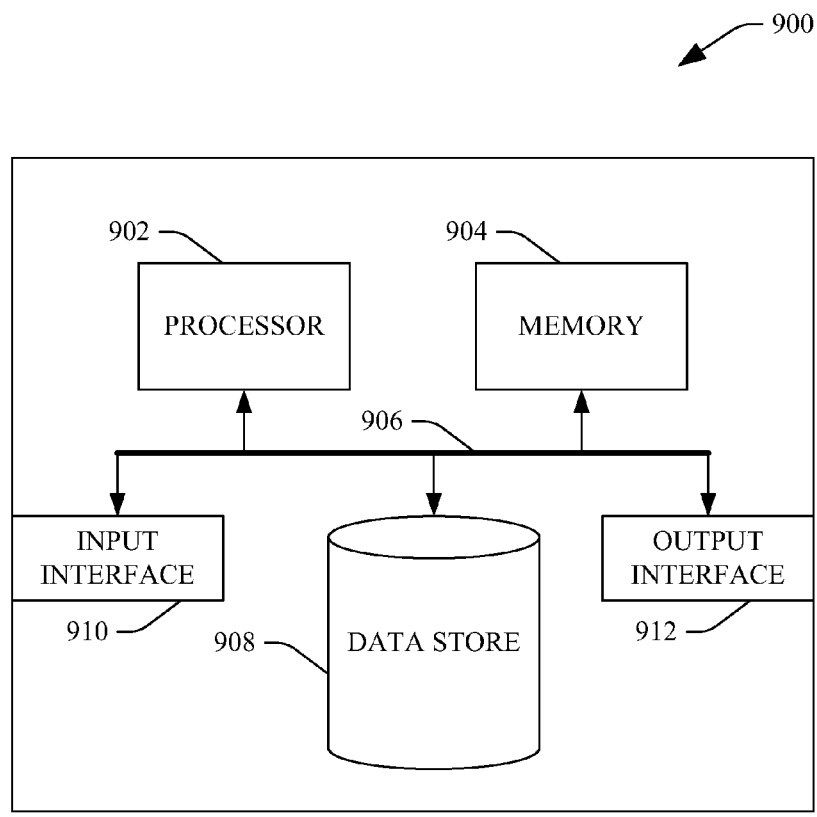
FIG. 9 is an exemplary computing system.

Now referring to FIG. 9, a high-level illustration of an exemplary computing device 900 that can be used in accordance with the systems and methodologies disclosed herein is illustrated. For instance, the computing device 900 may be used in a system that supports performing a search for documents over a plurality of different computing devices of a user. In another example, at least a portion of the computing device 900 may be used in a system that supports generating a search cache. The computing device 900 includes at least one processor 902 that executes instructions that are stored in a memory 904. The memory 904 may be or include RAM, ROM, EEPROM, Flash memory, or other suitable memory. The instructions may be, for instance, instructions for implementing functionality described as being carried out by one or more components discussed above or instructions for implementing one or more of the methods described above. The processor 902 may access the memory 904 by way of a system bus 906. In addition to storing executable instructions, the memory 904 may also store a results cache, an index cache, a Bloom filter, etc.

The computing device 900 additionally includes a data store 908 that is accessible by the processor 902 by way of the system bus 906. The data store 908 may be or include any suitable computer-readable storage, including a hard disk, memory, etc. The data store 908 may include executable instructions, a search cache, a global index, historical user searches, documents, key words, etc. The computing device 900 also includes an input interface 910 that allows external devices to communicate with the computing device 900. For instance, the input interface 910 may be used to receive instructions from an external computer device, from a user, etc. The computing device 900 also includes an output interface 912 that interfaces the computing device 900 with one or more external devices. For example, the computing device 900 may display text, images, etc. by way of the output interface 912.

Additionally, while illustrated as a single system, it is to be understood that the computing device 900 may be a distributed system. Thus, for instance, several devices may be in communication by way of a network connection and may collectively perform tasks described as being performed by the computing device 900.

As used herein, the terms "component" and "system" are intended to encompass hardware, software, or a combination of hardware and software. Thus, for example, a system or component may be a process, a process executing on a processor, or a processor. Additionally, a component or system may be localized on a single device or distributed across several devices. Furthermore, a component or system may refer to a portion of memory and/or a series of transistors.

It is noted that several examples have been provided for purposes of explanation. These examples are not to be construed as limiting the hereto-appended claims. Additionally, it may be recognized that the examples provided herein may be permutated while still falling under the scope of the claims.

What is claimed is:
1. A method, comprising:
  receiving, at a computing device, a local search cache, wherein the local search cache comprises a portion of a global index stored at a remote coordinator device communicatively coupled to a network comprising the computing device, the remote coordinator device and at least one other computer device, the global index indexing a plurality of documents stored across the computing device, the remote coordinator device and the at least one other computer device;

receiving, at the computing device, a query directed to the local search cache, wherein the query includes at least one keyword; and performing, at the computing device, a search based at least in part upon the received query, wherein performing the search comprises causing a processor to perform the search through utilization of the local search cache, the local search cache comprising a results cache, an index cache, and a Boolean cache, wherein the results cache includes a previously submitted query and search results for the previously submitted query, the index cache indexes keywords with identities and locations of a subset of the plurality of documents stored between the computing device, the remote coordinator device and at least one other computer device, and wherein the Boolean cache is a data structure that indicates whether the at least one keyword is included in an element set that corresponds to the plurality of documents that are stored between the computing device, the remote coordinator device and at least one other computer device.

2. The method of claim 1, wherein the Boolean cache is a Bloom filter and wherein the computing device is a mobile computing device.

3. The method of claim 1, further comprising:
determining respective sizes of the results cache, the index cache, and the Boolean cache; and
determining respective content of the results cache, the index cache, and the Boolean cache based at least in part upon the respective sizes of the results cache, the index cache, and the Boolean cache and search history with respect to the plurality of documents being stored between the computing device, the remote coordinator device and the at least one other computer device.

4. The method of claim 1, wherein performing the search comprises:
comparing the received query with queries in the results cache; and
if the received query is resident in the results cache, outputting an identity and location of at least one document, stored between the computing device, the remote device and at least one other computer device, that corresponds to the received query in the results cache.

5. The method of claim 4, wherein performing the search further comprises:
comparing keywords in the index cache with the at least one keyword in the query; and
if the at least one keyword is resident in the index cache, outputting an identity and location of at least one document, stored between the computing device, the remote device and at least one other computer device, that corresponds to the at least one keyword in the index cache.

6. The method of claim 5, wherein performing the search further comprises:
determining if the at least one keyword is in a range that corresponds to the Boolean cache; and
if the at least one keyword is not in the range that corresponds to the Boolean cache, transmitting the query to the remote coordinator device.

7. The method of claim 5, wherein performing the search further comprises:
determining that the at least one keyword is in a range that corresponds to the Boolean cache;
searching the Boolean cache for the at least one keyword; and if the at least one keyword is included in the Boolean cache, transmitting the received query to the remote coordinator device.

8. The method of claim 7, further comprising:
receiving, from the remote coordinator device, an update for the local server cache, wherein the update relating to a content of the received query transmitted to the remote coordinator device.

9. The method of claim 8, wherein the update comprising at least one keyword for incorporation into the results cache, the index cache, or the Boolean filter.

10. The method of claim 5, wherein performing the search further comprises:
determining that the at least one keyword is in a range that corresponds to the Boolean cache;
searching the Boolean cache for the at least one keyword; and
if the at least one keyword is not included in the Boolean cache, responding to the received query with a null result set.

11. The method of claim 10, wherein the comparing of the received query with the at least one query in the results cache is undertaken prior to the comparing of the at least one keyword in the index cache with the at least one keyword in the received query, and wherein the comparing of the at least one keyword in the index cache with the at least one keyword in the received query is undertaken prior to the searching of the Boolean cache for the at least one keyword.

12. The method of claim 11, wherein the range that corresponds to the Boolean cache is a range of alphabetical characters, wherein a first letter of the at least one keyword included in the query is in the range of alphabetical characters.

13. A computing device, comprising:
a processor; and
a memory that comprises a plurality of components that are executed by the processor, the plurality of components comprising:
a receiver component configured to:
receive, from a remote coordinator device, a local search cache, wherein the local search cache comprises a portion of a global index stored at the remote coordinator device communicatively coupled to a network comprising the computing device, the remote coordinator device and at least one other computer device, the global index indexing a plurality of documents stored between the computing device, the remote coordinator device and the at least one other computer device, and the local search cache relating to a subset of the plurality of documents; and
while disconnected from the network, receive a query; and
a search component configured to perform a search for at least one document in the plurality of documents based at least in part upon the query through utilization of the local search cache, wherein the local search cache comprises a results cache, an index cache, and a Bloom filter, and wherein the search component returns a search result set based at least in part upon the search.

14. The system of claim 13, wherein the local search cache comprises data indicative of at least one document available by way of the World Wide Web.

15. The system of claim 13, wherein the computing device is a mobile computing device.

16. The system of claim 15, wherein the mobile computing device is a mobile telephone.

17. The system of claim 13, wherein the search component searches the results cache prior to searching the index cache, and wherein the search component searches the index cache prior to searching the Bloom filter.

18. The system of claim 13, wherein the search component transmits the query to the remote coordinator device subsequent to searching the Bloom filter.

19. The system of claim 13, wherein, on subsequent reconnection of the computing device with the network, contents of the local search cache are updated by the remote coordinator device, and wherein the remote coordinator device determines sizes of the results cache, the index cache, and the Bloom filter, respectively.

20. A method, comprising:
receiving a search cache from a coordinator device, wherein the search cache comprises a results cache, an index cache, and a Bloom filter;
receiving a query from a user;
searching over the search cache based at least in part the query, wherein searching over the search cache comprises:
initially searching over the results cache for the query;
when the results cache comprises the query, returning an identity and location of at least one document corresponding to the query in the results cache to the user;
when the results cache does not comprise the query, subsequently searching over the index cache for at least one keyword in the query;
when the index cache comprises the at least one keyword, returning identity and location of at least one document corresponding to the at least one keyword in the index cache to the user;
when the index cache does not comprise the at least one keyword, subsequently determining if the at least one keyword is in a range corresponding to the Bloom filter;
when the at least one keyword is in the range corresponding to the Bloom filter, searching the Bloom filter for the at least one keyword;
when the Bloom filter fails to include the at least one keyword, subsequently returning a null result set to the user; otherwise
transmitting the query to the coordinator device; and
receiving a result set from the coordinator device.

* * * * *